United States Patent
Yang et al.

(10) Patent No.: US 12,397,872 B2
(45) Date of Patent: Aug. 26, 2025

(54) TYPE OF CUSHION ADJUSTMENT MECHANISM AND THE CHILD TRICYCLE

(71) Applicants: Yuanfu Yang, Hunan (CN); Minjie Liu, Jiangsu (CN)

(72) Inventors: Yuanfu Yang, Hunan (CN); Minjie Liu, Jiangsu (CN)

(73) Assignee: NINGBO SAINT WANBAO BABY PRODUCTS CO., LTD., Zhejiang (CN)

(*) Notice: Subject to any disclaimer, the term of this patent is extended or adjusted under 35 U.S.C. 154(b) by 749 days.

(21) Appl. No.: 17/726,541

(22) Filed: Apr. 22, 2022

(65) Prior Publication Data
US 2023/0264776 A1 Aug. 24, 2023

(30) Foreign Application Priority Data
Feb. 23, 2022 (CN) .......................... 202220370422.8

(51) Int. Cl.
*B62K 9/02* (2006.01)
*B62K 25/20* (2006.01)

(52) U.S. Cl.
CPC .............. *B62K 9/02* (2013.01); *B62K 25/20* (2013.01)

(58) Field of Classification Search
CPC .................................. B62K 9/02; B62K 25/20
See application file for complete search history.

(56) References Cited

U.S. PATENT DOCUMENTS

| | | | | |
|---|---|---|---|---|
| 9,039,025 B1* | 5/2015 | Shih | ..................... | B62K 15/006 280/282 |
| 2014/0260784 A1* | 9/2014 | Kamler | .................... | B62K 9/02 29/525.01 |
| 2015/0021877 A1* | 1/2015 | Kim | ........................ | B62B 7/142 280/282 |
| 2018/0244335 A1* | 8/2018 | Baron | ...................... | B62K 5/06 |
| 2019/0217914 A1* | 7/2019 | Huang | ..................... | B62K 5/06 |

* cited by examiner

*Primary Examiner* — Alentin Neacsu
*Assistant Examiner* — Marlon A Arce
(74) *Attorney, Agent, or Firm* — Ming Jiang; OPENPTO US LLC

(57) ABSTRACT

This utility model provides a novel cushion adjustment mechanism and child tricycle, which includes cushion; one end of the said main beam tube is connected with the cushion and the other end is connected with the tricycle body; the adjustment unit is fixing-connected with the main beam tube. The adjustment unit is provided with a positioning assembly; the rear part includes two fixing plates. One end of the fixing plates is connected with the rear wheel and the other end is connected with the adjustment unit. The fixing plate connected with the adjustment unit is provided with a counter locking screw rod. One end of the counter locking screw rod passes through the rotation hole and is fixing-connected with the adjustment unit. After adjustment, the child tricycle using this mechanism will have a good stability and avoids the slippage issue of the cushion height controlled by the friction force.

8 Claims, 5 Drawing Sheets

TYPE OF CUSHION ADJUSTMENT MECHANISM AND THE CHILD TRICYCLE

BACKGROUND OF THE INVENTION

This application belongs to the field of the child tricycle and especially it involves with a type of the cushion adjustment mechanism and the child tricycle. Though currently the child tricycles have many kinds, they have a single function. With the increase of children's age, they will re-buy different kinds of child tricycle and dispose the original one. Children's fast growth leads to their frequent replacement. Usually, the old child tricycle is perfect, but it is unable to serve them when the children grow taller and he will buy the one of much proper cushion height. Thus, many families will pile up several child tricycles, which occupies land and impairs the environment. It is impossible to re-utilize child tricycle, which results in material-waste, and makes general families to suffer from a high consumption. In order to solve this issue, bicycles of adjustable cushion-height are marketed, for example CN201921698496.9, whose cushion height is adjustable through regulating the cushion tube height. However, with the mode of controlling the cushion tube height through the friction force, after a period of use, usually the cushion tube will slip, which leads to unstable control of cushion height, renders the user inconvenience, and results in safety hazards. The insertion-withdrawal type of changing cushion tube height would seriously impair the integral tricycle appearance.

BRIEF SUMMARY OF THE INVENTION

In order to eliminate slippage which usually occurs during control of cushion height through the friction force. This application provides a type of cushion adjustment mechanism and child tricycle, which through simple operation may adjust the cushion height, improve the stability of connection between cushion and tricycle body and the safety performances of the child tricycle, and eliminate the problem of unstable cushion height.

On the one hand, this application provides a type of cushion adjustment mechanism, which includes the cushion; main beam tube, one end of the main beam tube is connected with the cushion and the other end is connected with the tricycle body; adjustment unit, the adjustment unit is fixing-connected with the main beam tube. The adjustment unit is provided with a positioning assembly; rear part, the rear part includes two fixing plates. The two fixing plates are respectively located by both sides of the adjustment unit. The fixing plate is provided with a rotation hole. One end of the fixing plates is connected with the rear wheel and the other end is connected with the adjustment unit. The end of the fixing plate connected with the adjustment unit is provided with a counter locking screw rod. One end of the counter locking screw rod passes through the rotation hole and is fixing-connected with the adjustment unit and the other end is connected with the fixing plate. The fixing plate may rotate around the counter locking screw rod; The side of fixing plates orientating towards the adjustment unit from top downwards is provided with at least two positioning grooves. The positioning assembly includes a positioning part. The positioning part is inserted into the positioning groove of the two fixing plates at the same height.

Further, the adjustment unit also includes a control unit, the lower end of the adjustment unit is provided with a guide groove, the control unit passes through the guide groove, and the control unit may slide along the guide groove; the positioning part includes 2 fixation pins. The upper end of the fixation pin is provided with a cover plate. One end of the fixation pin is inserted into the positioning groove and the other end is provided with a positioning hole. The lower end of the cover plate is provided with 2 positioning columns. The positioning column passes through the positioning hole and is inserted into the control unit. One end of the cover plate far from the positioning column is fixedly connected with the control unit, and the positioning column is inserted with a torsion spring. One end of the torsion spring is connected with the fixation pin and the other end is connected with the cover plate.

Further, the control unit includes a slide block and a first resetting spring, one end of the first resetting spring compresses the inner wall of the adjustment unit and the other end compresses the slide block. The slide block is set at the guide groove. The upper end of the slide block is connected with the positioning part and its lower end passes through the guide groove, and the slide block may slide along the guide groove.

Further, the positioning part is a positioning bolt, and the positioning groove is provided with threads adapting with the positioning bolt. The positioning groove passes through the fixing plate and the positioning bolt passes through the positioning groove.

Further, the positioning part is a latch pin and the end of the latch pin located at the outside of the fixing plate is provided with a handle. The positioning groove passes through the fixing plates, the outside of the fixing plate is provided with a fixing clip. The connection of the fixing clip with the fixing plate is set with an elastic snap. The latch pin passes through the positioning groove and the handle is adapted with the fixing clip.

Further, The outside of the fixing plates is set with a press button. The press button includes the press button head and the telescopic member. The press button head is fixedly connected with the telescopic member. The telescopic member passes through the positioning groove and is fixedly connected with the positioning part. The positioning groove passes through the fixing plates. The sidewall of the fixing plate close to the adjustment unit is provided with a transfer slot and the transfer slot is connected with the positioning groove. When the telescopic member is under the compression state, the press button head is located at the inside of the fixing plate and may slide along the transfer slot. When the telescopic member is at the expansion state, the press button head is located at the outside of the fixing plate.

Further, the the counter locking screw rod and the rotation hole are provided with a mutual-meshed gear structure.

Further, the center of the the rear wheel is provided with a screw rod. One end of the screw rod is connected with the rear wheel and the other end is connected with the fixing plate.

Further, the adjustment unit is fixed at the lower side of the main beam tube through bolts. The inside of the adjustment unit is provided with a cavity. The cavity is used to fix the positioning assembly, and the cavity passes through adjustment unit and orientates towards the fixing plate.

On the other hand, this application provides a type of child tricycle, including the above-mentioned cushion adjustment mechanism.

The above technical schemes show that the technical schemes of this utility model will obtain the following useful effects:

The cushion, the main beam tube and the adjustment unit are connected together, the adjustment unit is connected with the rear part and the rear part is connected with the rear wheel. When one requires adjustment of the cushion height, he may remove the positioning part from the positioning groove, lift the rear part to make it rotate around the counter locking screw rod, then, he may place the positioning part into the positioning groove of the fixing plates at a higher position so as to elevate the cushion height. This adjustment mode of the cushion height improves the stability of the adjusted cushion and eliminates the slippage which usually occurs during control of cushion height through the friction force.

It shall be understood that if the above-mentioned ideas and the following detailed extra ideas are not contrary, they shall be deemed as part of this utility model.

From the following description in combination with the attached drawings, one may overall understand the forewords, other aspects, implementation examples and characteristics shown in this utility model. The other additional aspects of this utility model, e.g. characteristics and/or useful effects of illustrative implementation mode will be obvious in the following description and acquired from the practice of the specific implementation modes shown in this utility model.

BRIEF DESCRIPTION OF THE DRAWINGS

The attached drawings are not plotted as per proportion. In the attached drawings, each identical or similar composition part may be expressed with a same identification number in each drawing. For clarity, not every composition part in each drawing is identified. Now, the aspects of the implementation examples of this utility model are described with examples and by reference to the attached drawings, where:

Drawing 1 is the schematic structural drawing of implementation examples of the child tricycle of this utility model;

Figure 1:
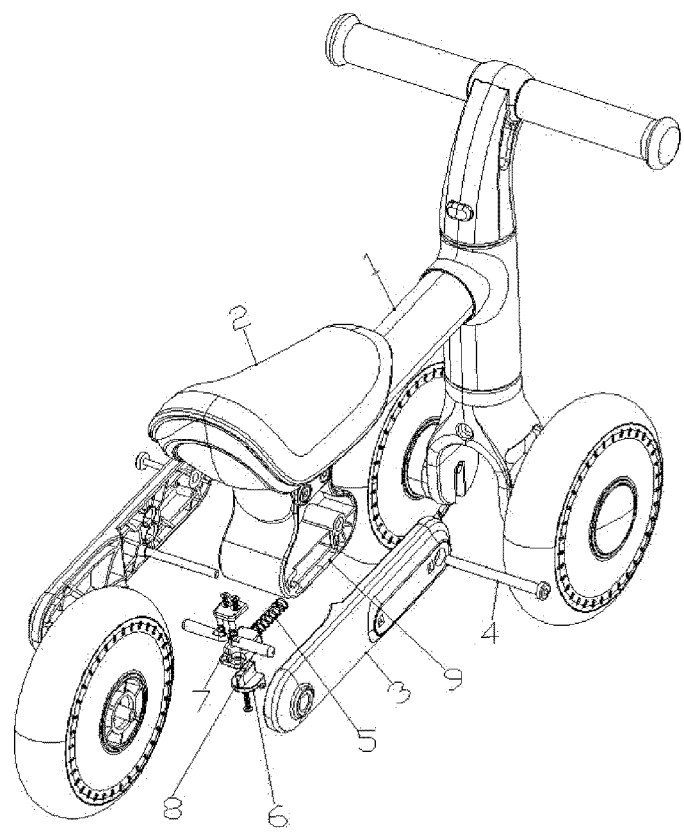

Drawing 2 is the schematic breakdown drawing of implementation examples of the positioning assembly of this utility model;

Drawing 3 is the schematic structural drawing of implementation examples of positioning assembly of this utility model;

Drawing 4 is the schematic drawing of implementation examples of child tricycle cushion of this utility model at lower position;

Drawing 5 is the schematic drawing of the implementation examples of child tricycle cushion of this utility model at higher position;

Drawing 6 is the section view of the implementation examples of child tricycle of this utility model;

Drawing 7 is the bottom view of the implementation examples of child tricycle of this utility model;

Drawing 8 is the section view of the implementation examples of child tricycle cushion of this utility model at lower position;

Drawing 9 is the section view of the implementation examples of child tricycle cushion of this utility model at higher position;

Where, the meanings of the identification in the attached drawings are as follows:

1. main beam tube; 2. cushion; 3. fixing plates; 4. counter locking screw rod; 5. first resetting spring; 6. slide block; 7. torsion spring; 8. fixation pin; 9. adjustment unit; 10. positioning groove; 11. Guide groove

DETAILED DESCRIPTION OF THE INVENTION

In order to make the purpose, technical schemes and merits of implementation examples of this utility model clearer, the technical schemes are clearly and completely described in combination with attached drawings of the implementation examples of this utility model. Obviously, the described implementation examples are merely a part of the implementation examples of this utility model, instead of the entire implementation examples. The implementation examples of this utility model obtained based on the description by the common technicians in this field and the other implementation examples without offering any creative labor belong to the protection scope of this utility mode. Unless otherwise defined, the technical terms or science terms used herein shall have the common meanings understood by common skilled persons in this field.

The "first", "the second" and similar words used in application and claims of this utility model patent never expresses the sequence, quantity or importance, and they merely distinguish different composition part. Similarly, unless other conditions clearly indicated in the context, the similar words such as "one piece", "one" or "the" in single form never express the quantity restriction, they merely express that at least one piece exists. The similar words such as "including" or "containing" denote the elements or objects appearing before the "including" or "containing" which covers the characteristics, integral, procedures, operation, elements and/or assembled part, but they never eliminate one or several existence or addition of the object which covers the characteristics, integral, procedures, operation, elements and/or assembled part. "Up", "Down", "left" and "right" merely indicate the relative position. When the absolute position of the described object changes, its relative position also probably correspondingly changes.

It is to eliminate the slippage occurring in adjustment of the cushion with the prior regulation mode of the friction force. In this utility model, the cushion and the main beam tube are connected, one may make regulation of the adjustment unit and the rear part and change the cushion height.

As shown in FIG. 1, at execution of this utility model, the implementation examples provide a type of cushion adjustment mechanism, which include cushion 2; main beam tube 1: cushion 2 is fixed above main beam tube 1 through bolts, and main beam tube 1 is fixedly connected with the tricycle body; adjustment unit 9: adjustment unit 9 is fixed below main beam tube 1 through bolts. Adjustment unit 9 is provided with a positioning assembly; a rear part: the rear part includes two fixing plates 3. Fixing plates 3 is provided with a rotation hole, one end of fixing plate 3 is connected with the rear wheel and the other end is connected with adjustment unit 9. Two fixing plates 3 are respectively allocated by both sides of adjustment unit 9. Fixing plate 3 is connected with adjustment unit 9 through counter locking screw rod 4. One end of counter locking screw rod 4 passes through the rotation hole and is fixedly connected with adjustment unit 9 and the other end is connected fixing plates 3. Fixing plates 3 may rotate around counter locking screw rod 4. The side of fixing plates 3 orientating towards adjustment unit 9 from top downwards is provided with at least 2 positioning grooves 10. The positioning assembly includes a positioning part. The positioning part is inserted into positioning groove 10 of two fixing plates 3 at the same height.

For regulating the height of cushion 2, the positioning part is removed from positioning groove 10, fixing plate 3 is elevated to make it rotate round counter locking screw rod 4, then, the positioning part is fixed after being placed into the positioning groove 10 of fixing plate 3 at a higher position so as to relatively lift cushion 2. One end of the positioning part is at adjustment unit 9 and the other end is at fixing plate 3, by this way cushion 2 is supported. This mode will eliminate the risk of slippage which occurs during control of cushion height through the friction force. Meanwhile, since cushion 2 is connected with main beam tube 1, this adjustment mode will not seriously impair the appearance of the integral tricycle, and the aesthetics of the tricycle is kept. The above-mentioned positioning part may be a long rod and two ends of the long rod are respectively at the positioning grooves of two fixing plates. The positioning part also may be two short rods, one end of the short rod is at the adjustment unit and the other end is in the positioning groove.

For easier movement of the positioning part, adjustment unit 9 also includes a control unit. The lower end of adjustment unit 9 is provided with guide groove 11, the control unit passes through guide groove 11, and the control unit may slide along guide groove 11. The positioning part includes two fixation pins 8, the upper end of fixation pin 8 is provided with a cover plate, fixation pin 8 is provided with a positioning hole, and the lower end of the cover plate is provided with two positioning columns. The positioning column passes through the positioning hole and is inserted into the control unit. The cover plate is fixedly connected with the control unit through bolts. The positioning column is inserted with a torsion spring 7. One end of torsion spring 7 is connected with fixation pin 8 and the other end is connected with the cover plate. Through sliding the control unit along guide groove 11, after contacting the fixation pin 8 with positioning groove 10, the inner wall will be stressed and rotated until removal from positioning groove 10. After elevating fixing plate 3, the control unit slides back again. Under the torsion of torsion spring 7, fixation pin 8 will rotate again until inserting into positioning groove 10, and thus height adjustment of cushion 2 is finished.

Guide groove 11 passes through the lower end of adjustment unit 9. The control unit passes through guide groove 11, the portion of the inner side of the control unit at adjustment unit 9 is fixed at guide groove 11, which will prevent the control unit from moving out guide groove 11 and easily drive the control unit to slide along guide groove 11.

Figure 2:
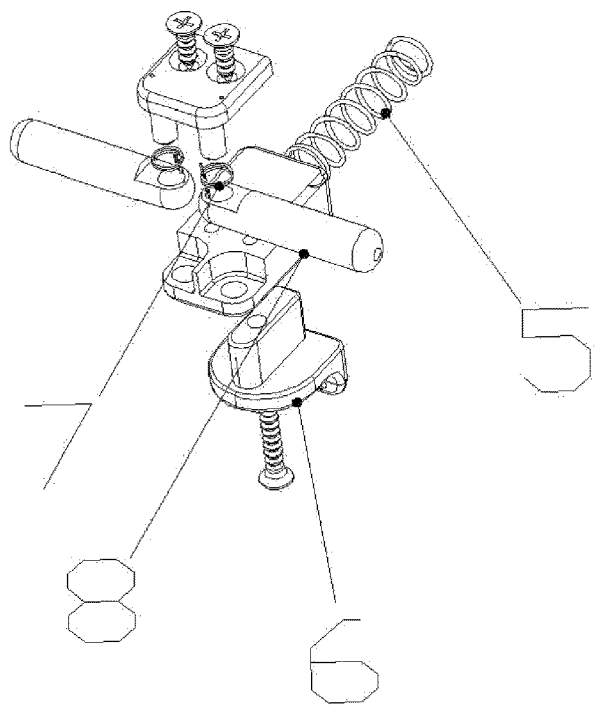
Figure 3:
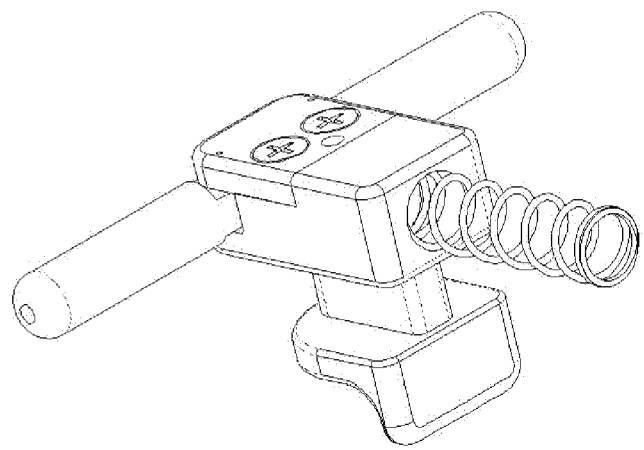

As shown in FIG. 2 and FIG. 3, the control unit includes slide block 6 and first resetting spring 5. One end of first resetting spring 5 is compressed against the inner wall of adjustment unit 9 and the other end is compressed against slide block 6. Slide block 6 is fixed at guide groove 11. The upper end of slide block 6 is connected with the positioning part and its lower end passes through guide groove 11. Slide block 6 may slide along guide groove 11, the slide may drive fixation pin 8 to rotate and to remove out from positioning groove 10. When fixing plate 3 is lifted to a given position, under the action of first resetting spring 5, slide block 6 will automatically rebound and drive fixation pin 8 to insert into positioning groove 10. Resetting of slide block 6 by first resetting spring 5 is easy and safe. Slide block 6 may be integrally formed and also may be assembled.

In another implementation examples, in the movement direction of slide block 6, positioning groove 10 is provided with an opening. One end of the positioning part is connected with slide block 6 and the other end is inserted into positioning groove 10. Movement of slide block 6 makes the positioning part remove from the opening of positioning groove 10, then, the height of fixing plate 3 is adjusted to make the positioning part allocate in the opening of the other positioning groove 10. Resetting of slide block 6 with the elastic force of first resetting spring 5 makes the positioning part slide to the opening of the other positioning groove 10.

In other implementation modes, the positioning part is a positioning bolt. The positioning groove is provided with threads adapting with the positioning bolt. Positioning groove 10 passes through fixing plate 3, and the positioning bolt passes through positioning groove 10. By this way, for adjustment of the cushion height, the positioning bolt is taken out, the height of fixing plates 3 is regulated, and the positioning bolt is inserted and fixed again.

In other implementation modes, the positioning part is a latch pin and the end of the latch pin located at the outside of fixing plate 3 is provided with a handle. Positioning groove 10 passes through fixing plate 3, the outside of fixing plate 3 is provided with a fixing clip, and the connection of the fixing clip with fixing plate 3 is provided with an elastic snap. The latch pin passes through positioning groove 10, and the handle is adaptive with the fixing clip. The handle may be a foldable handle and also may be a bendable handle. When this implementation mode is executed, if adjustment of the cushion height is required, the fixing clip is taken out from the elastic snap by the handle, the positioning part is taken out from the fixing plate, the height of the fixing plate is adjusted, and then the positioning part.

In other implementation modes, the outside of fixing plate 3 is set with a press button and the press button includes the press button head and the telescopic member. The press button head is fixedly connected with the telescopic member, the telescopic member passes through positioning groove 10 and is fixedly connected with the positioning part. Positioning groove 10 passes through fixing plate 3, and the side wall of fixing plates 3 close to the adjustment unit is provided with a transfer slot and the transfer slot is connected with positioning groove 10. When the telescopic member is under the compression state, the press button head is located at the inner side of fixing plate 3 and may slide along the transfer slot. When the telescopic member is at the expansion state, the press button head is located at the outside of fixing plate 3. For adjusting the height of cushion 2, the press button of the telescopic member is pressed to make it at the compression state. At that time, the press button head is at the inner side of fixing plate 3, movement of fixing plate 3 makes the press button head move into the other positioning groove 10 through the transfer slot. The press button head is pressed to eliminate the expansion state and to make the press button head extend from the outside of fixing plate 3. The cushion height is adjusted with this mode. The above mentioned telescopic member may be of the elastic structure similar to the ball-point pen and also may be of the telescopic structure of electrical press button.

In order to make fixing plate 3 easily and safely rotate round counter locking screw rod 4, counter locking screw rod 4 and the rotation hole are set with a mutual-meshed structure. The mutual-meshed structure makes fixing plate 3 much easily and freely rotate round counter locking screw rod 4.

Figure 4:
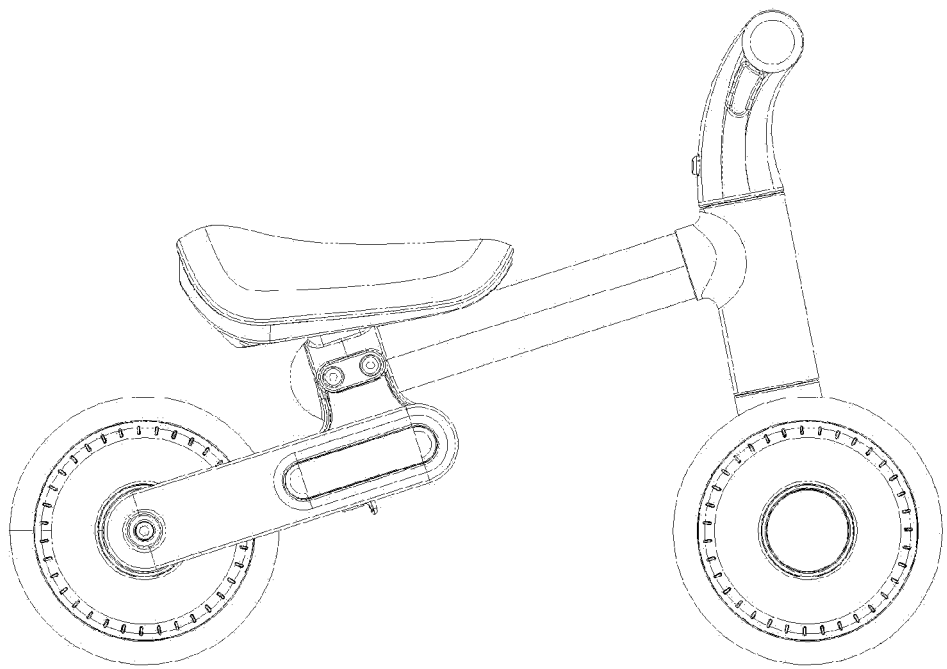
Figure 5:
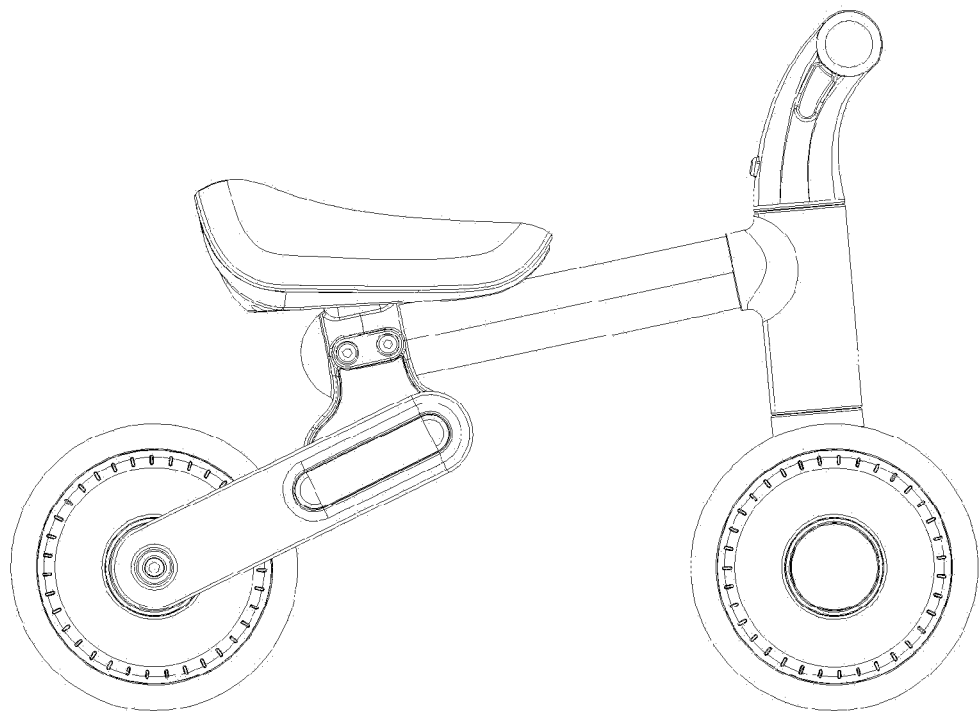
Figure 6:
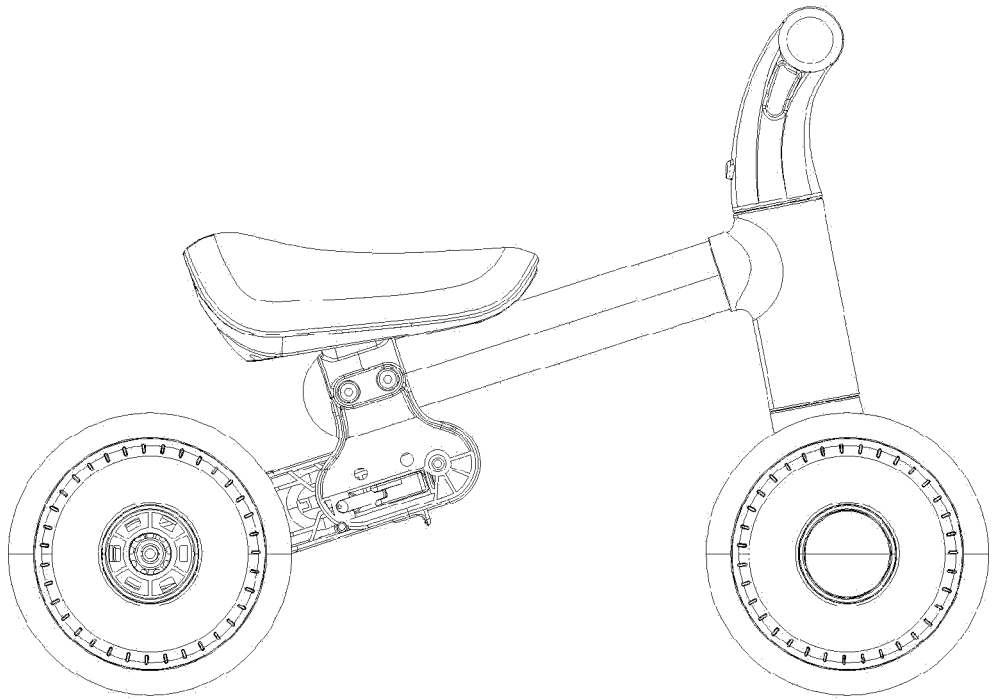
Figure 7:
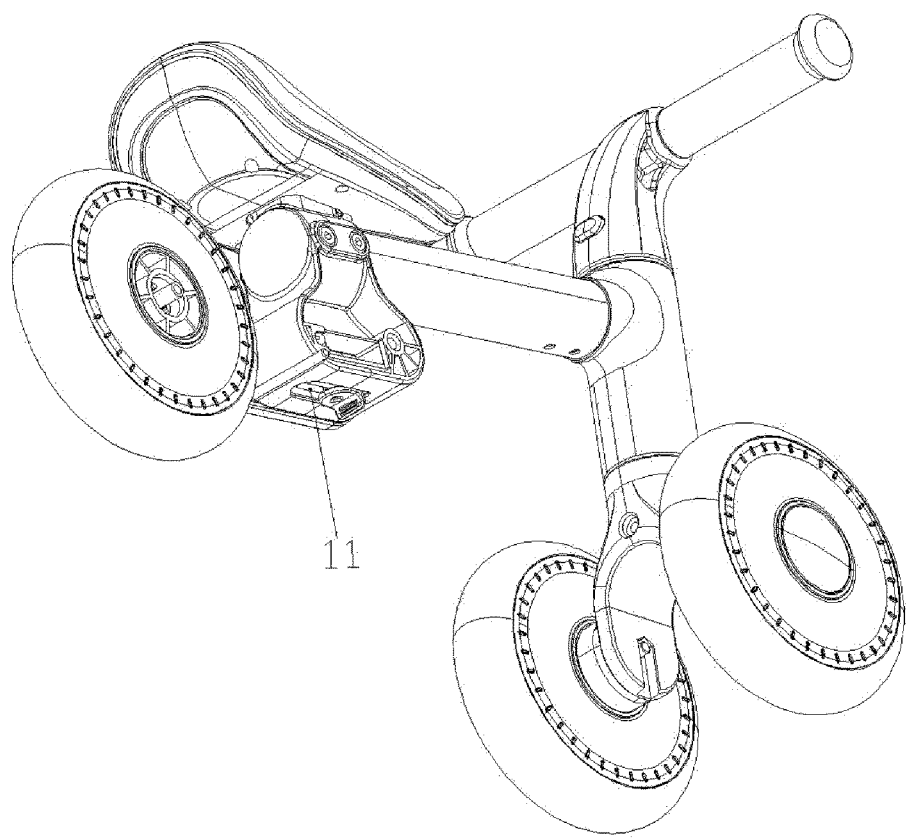
Figure 8:
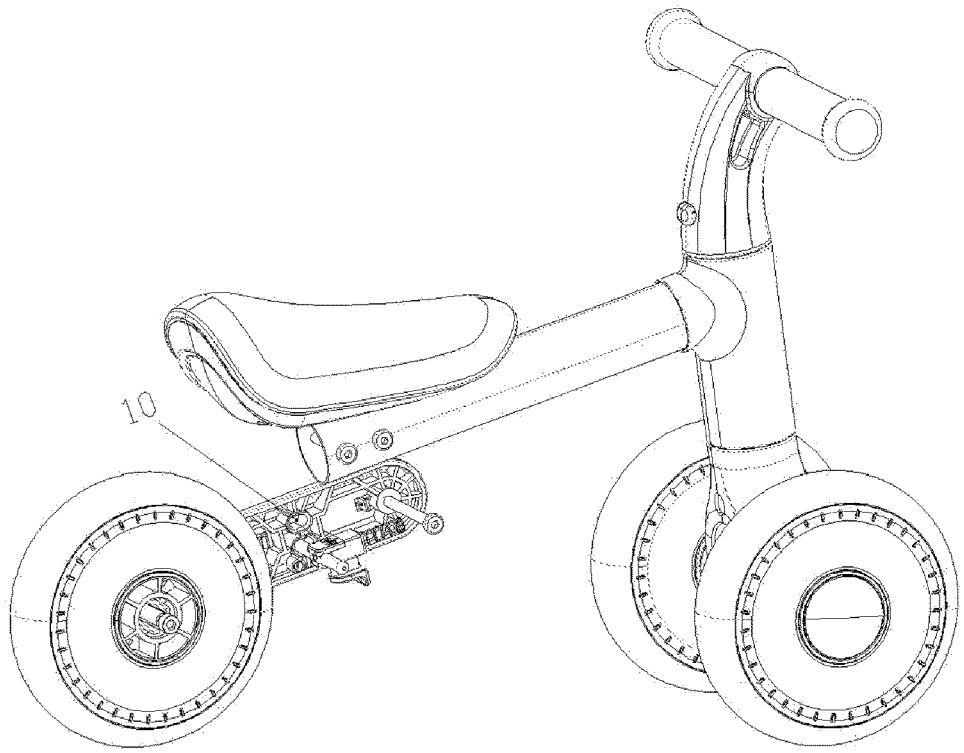
Figure 9:
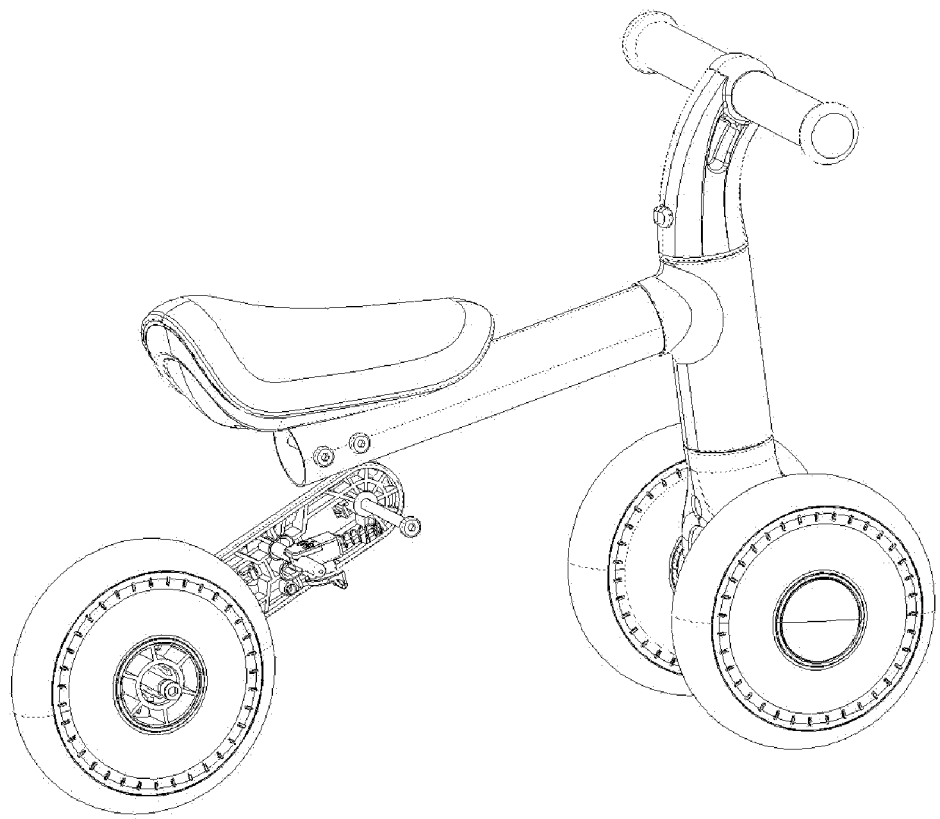

As shown in FIG. 4, in the implementation example, the center of the rear wheel is set with a screw rod, one end of the screw rod is connected with the rear wheel and the other end is connected with fixing plate 3, which makes the integral tricycle much stabler.

In order to facilitate assembly or maintenance, adjustment unit 9 is fixed at the lower side of main beam tube 1 through bolts. The inside of adjustment unit 9 is provided with a cavity, the positioning assembly is set inside the cavity, and the cavity passes through adjustment unit 9 and orientates towards one side of fixing plate 3.

On the other hand, the implementation examples provide a type of child tricycle, including the above-mentioned cushion adjustment mechanism. The cushion adjustment mechanism is simple in structure and easy in operation and the adjusted cushion is stable and durable.

The cushion adjustment mechanism may be used in other bicycles or electric-driven cars, which will not be detailed herein.

Though implementation examples of this utility model are disclosed as above, they never restrict this utility model. The technicians in the technical field of this utility model may make various modifications and dressings within the spirit and scope of not deviating from this utility model. Hence, the protection scope of this utility model defined in the claims shall prevail.

What is claimed is:

1. A cushion adjustment mechanism, comprising:
   a cushion;
   a main beam tube; wherein one end of the main beam tube is connected with the cushion, and another end of the main beam tube is connected with a tricycle body;
   an adjustment unit, fixedly connected with the main beam tube, and is provided with a positioning assembly;
   a rear part, which comprises two fixing plates located on two sides of the adjustment unit respectively;
   each of the two fixing plate is provided with a rotation hole; one end of each of the two fixing plates is connected with a rear wheel, and another end of each of the two fixing plates is connected with the adjustment unit; said another end of each of the fixing plates connected with the adjustment unit is provided with a counter locking screw rod; one end of the counter locking screw rod passes through the rotation hole and is fixedly connected with the adjustment unit, and another end of the counter locking screw rod is connected with a respective fixing plate rotatable around the counter locking screw rod;
   one side of each of the two fixing plates facing towards the adjustment unit is provided with at least two positioning grooves vertically spaced apart from one another:
   the positioning assembly includes a positioning part inserted into corresponding positioning grooves of the two fixing plates wherein said corresponding positioning grooves face each other at a same height;
   the adjustment unit also comprises a control unit; a bottom of the adjustment unit is provided with a guide groove, the control unit passes through the guide groove, and the control unit is slidable in the guide groove;
   the control unit includes a slide block and a first resetting spring, one end of the first resetting spring presses against an inner wall of the adjustment unit, and another end of the first resetting spring presses against the slide block;
   the slide block is fitted in the guide groove; an upper end of the slide block is connected with the positioning part, and a lower end of the slide block passes through the guide groove; the slide block is slidable in the guide groove.

2. The cushion adjustment mechanism of claim 1, wherein the positioning part includes two fixation pins; an upper end of each of the fixation pins is provided with a cover plate; one end of each of the two fixation pins is inserted into a corresponding positioning groove, and another end is provided with a positioning hole; a bottom surface of the cover plate is provided with two positioning columns; each of the two positioning columns passes through a corresponding positioning hole and is inserted into the control unit; one end of the cover plate distal from the two positioning columns is fixedly connected with the control unit, and each of the two positioning columns is sleeved with a torsion spring; one end of the torsion spring is connected with a corresponding fixation pin, and another end of the torsion spring is connected with the cover plate.

3. The cushion adjustment mechanism of claim 1, wherein the positioning part is a positioning bolt, and each of said at least two positioning grooves is provided with threads adapting with the positioning bolt; said at least two positioning grooves penetrate through a corresponding fixing plate, and the positioning bolt passes through said corresponding positioning grooves of the two fixing plates.

4. The cushion adjustment mechanism of claim 1, wherein the positioning part is a latch pin, and each of two ends of the latch pin located outside a corresponding fixing plate is provided with a handle;
   said at least two positioning grooves penetrate through a corresponding fixing plate, an outer side of each of the two fixing plates is provided with a fixing clip; a connection part of the fixing clip with the corresponding fixing plate is provided with an elastic snap;
   the latch pin passes through said corresponding positioning grooves of the two fixing plates, and the handle is adapted with a corresponding fixing clip.

5. The cushion adjustment mechanism of claim 1, wherein an outer side of each of the two fixing plates is provided with a press button; the press button includes a press button head and a telescopic member; the press button head is fixedly connected with the telescopic member; the telescopic member passes through a corresponding positioning groove and is fixedly connected with the positioning part;
   said at least two positioning grooves penetrate through a corresponding fixing plates; a sidewall of each of the two fixing plates proximal to the adjustment unit is provided with a transfer slot, and the transfer slot is connected with said at least two positioning grooves;
   when the telescopic member is under a retracted state, the press button head is located inside a corresponding fixing plate and is slidable in the transfer slot; when the telescopic member is at expansion telescopically extended state, the press button head is located outside the corresponding fixing plate.

6. The cushion adjustment mechanism of claim 1, wherein each of two sides of a center of the rear wheel is provided with a screw rod; one end of the screw rod is connected with the rear wheel, and another end of the screw rod is connected with a corresponding fixing plate.

7. The cushion adjustment mechanism of claim 1, wherein the adjustment unit is fixed at a bottom side of the main beam tube through bolts; the adjustment unit is provided with a cavity; the positioning assembly is fitted in the cavity, and the cavity opens towards the two fixing plates.

8. A child tricycle, comprising the cushion adjustment mechanism of claim 1.

* * * * *